3,198,479
METERING AND SHUT-OFF VALVE HAVING STRAIGHT-THROUGH FLOW CHARACTERISTICS
Eugene C. Greenwood, 413 Poinsettia, Corona del Mar, Calif.
Filed June 4, 1962, Ser. No. 203,680
7 Claims. (Cl. 251—121)

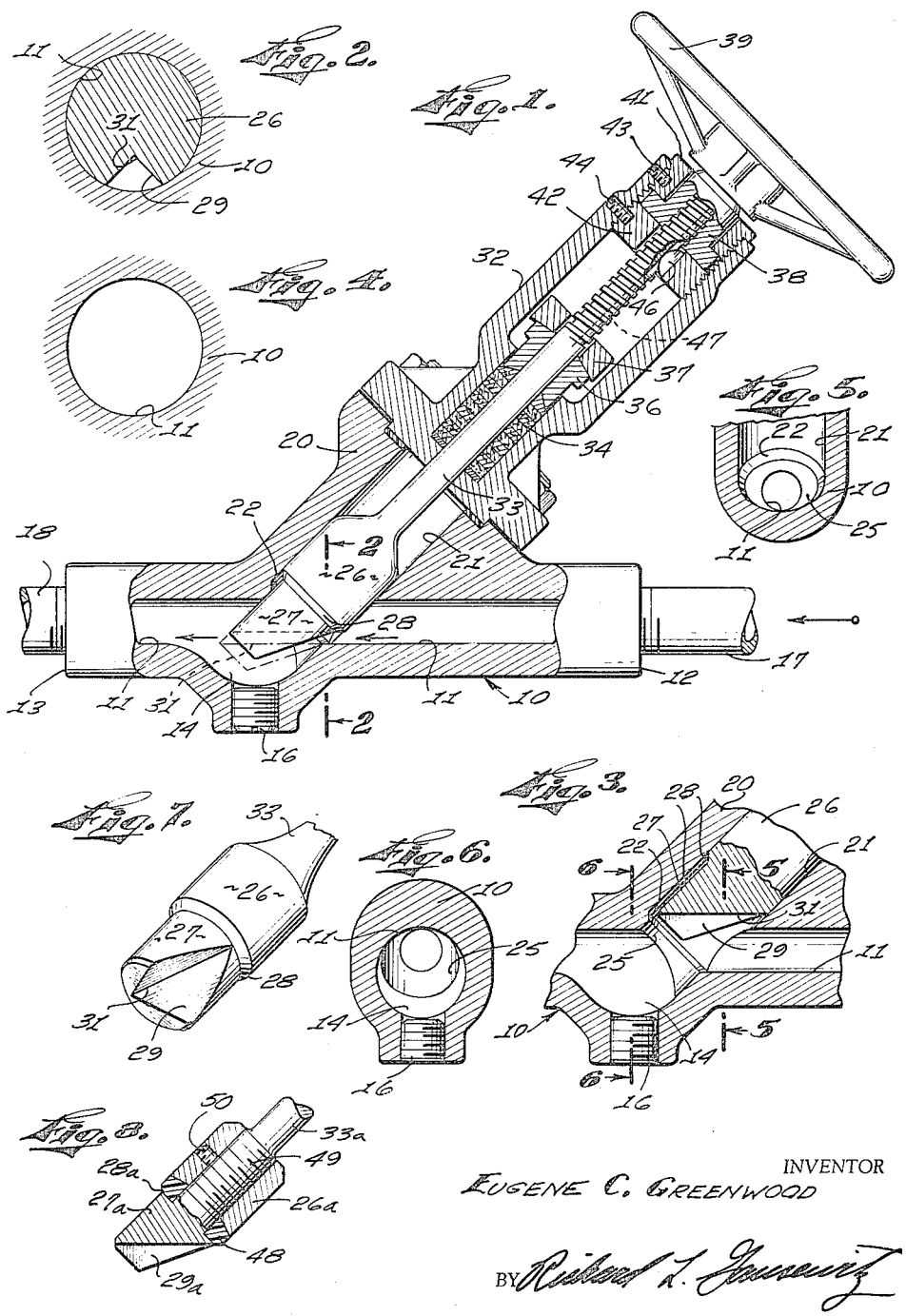

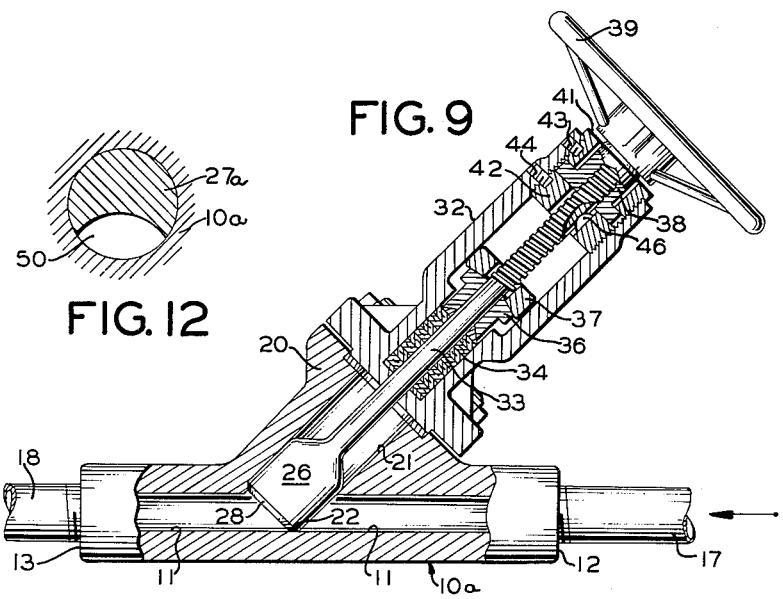
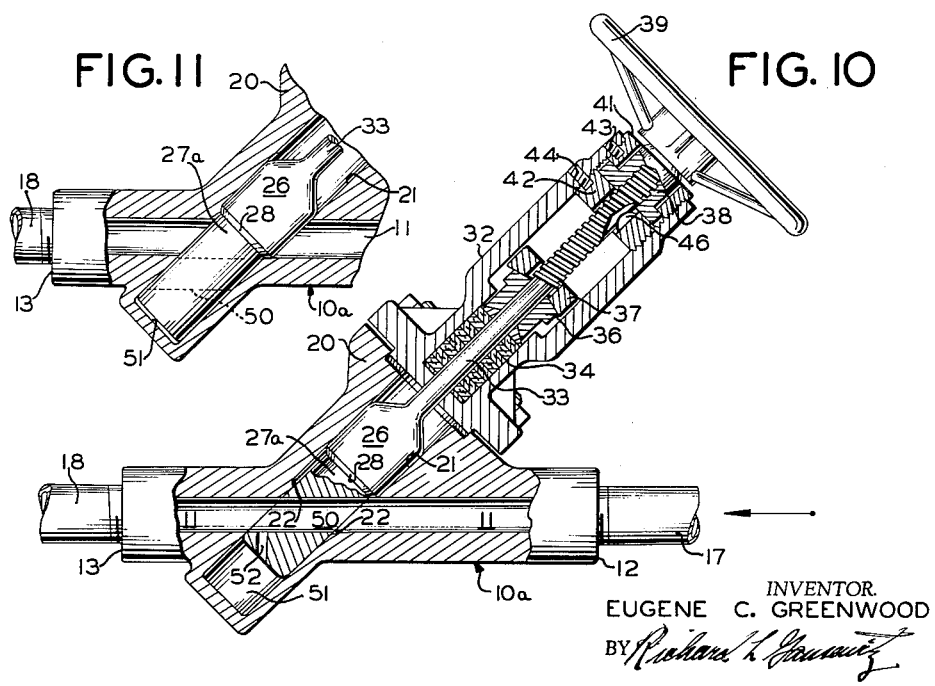

This invention relates to a metering and shut-off valve. The present application is a continuation-in-part of co-pending patent application Serial No. 14,846, filed March 14, 1960, now abandoned, for a Metering and Shut-Off Valve Having Straight-Through Flow Characteristics.

An object of the invention is to provide a metering valve having greatly increased capacity in comparison to other metering valves, and characterized by a minimum of turbulence in the fluid passed therethrough.

Another object of the invention is to provide a throttling valve characterized by a lower velocity head loss or fluid friction loss than other throttling valves.

Another object of the invention is to provide a metering valve characterized by infinitely variable flow control and a linear flow curve.

Another object of the invention is to provide a valve which may be actuated from fully closed position through an infinite number of flow positions to fully open position, and which when in open condition presents no obstruction to straight-line fluid flow.

Another object of the invention is to provide a valve which will operate for very long periods of time without substantial wear on the valve components.

Another object is to provide a metering valve which has a much smaller tendency to clog, freeze or vibrate than conventional metering valves.

An additional object of the invention is to provide a metering valve characterized by more accurate and reliable control of flow than conventional metering valves, particularly in the lower flow ranges.

Another object is to provide a metering and shut-off valve having a valve seat which is so oriented relative to the flow passage through the valve that substantially no turbulence is created thereby.

A further object is to provide a metering and shut-off valve characterized by the complete absence of turbulence when the valve is in fully-open position.

These and other objects and advantages of the invention will be more fully set forth in the following specification and claims, considered in connection with the attached drawings to which they relate.

In the drawings:

FIGURE 1 is a view, primarily in vertical central section, illustrating a combination shut-off and metering valve constructed in accordance with the present invention, the movable valve element being shown full line in partially open position and phantom line in fully closed position;

FIGURE 2 is a schematic transverse view taken generally on line 2—2 of FIGURE 1 and illustrating the flow path which is presented when the valve is in a partially open position;

FIGURE 3 is a fragmentary sectional view corresponding to a portion of FIGURE 2 but illustrating the valve in fully open position;

FIGURE 4 is a schematic transverse section corresponding generally to FIGURE 2 but illustrating the flow path when the valve is in fully open condition;

FIGURE 5 is a schematic transverse section taken generally on line 5—5 of FIGURE 3 and illustrating the relation between the valve seat and the flow passage;

FIGURE 6 is a fragmentary transverse section on line 6—6 of FIGURE 3;

FIGURE 7 is a perspective view illustrating the head and tip of the movable valve element;

FIGURE 8 is a transverse section of a modified head and tip, in which a soft shoulder is provided for seating on the valve seat;

FIGURE 9 is a sectional view corresponding generally to FIGURE 1 but illustrating a valve constructed in accordance with a second embodiment of the invention, in fully-closed position;

FIGURE 10 is a sectional view illustrating a valve constructed in accordance with a third embodiment of the invention, in fully-open position;

FIGURE 11 is a fragmentary sectional view corresponding to the central portion of FIGURE 10, showing the valve fully closed; and FIGURE 12 is a schematic view indicating the flow section when the valve of FIGURES 10 and 11 is in an intermediate position.

Referring to the drawings, the combination metering and shut-off valve is illustrated to comprise an elongated valve body 10 having a straight-through passage 11 therein for transmission of fluid from the inlet end 12 of the body to the outlet end 13 thereof. The passage 11 has a cylindrical wall throughout its entire length except at a somewhat bulbous chamber or cavity 14 which is formed during casting of the valve body. Cavity 14 extends laterally from the passage 11, as viewed in FIGURE 6, and also downwardly from passage 11 as viewed therein and in FIGURES 1 and 3, but not upwardly therefrom. The valve body may be provided with a clean-out plug 16 at chamber 14, and may be internally threaded at the ends 12 and 13 for reception of pipes 17 and 18.

Valve body 10 is integrally formed, above and somewhat upstream from cavity 14, with a boss portion 20. A first cylindrical bore, numbered 21, is formed in said boss portion and has a diameter much larger than that of the straight-through passage 11, for example twice the diameter thereof. The axis of bore 21 lies in the same plane as the axis of passage 11, and such axes intersect to form an acute angle which is located on the upstream side of bore 21. More specifically, such acute angle should be about forty-five degrees.

At its inner end, the first bore 21 terminates in a continuous circular valve seat 22 lying in a plane which is perpendicular to the axis of such bore 21. Referring to FIGURE 5, it is pointed out that the upper portion of valve seat 22 is disposed above the elevation of the upper portion of flow passage 11, and that the side portions of the valve seat 22 are disposed outwardly from the side portions of the flow passage. The only region where the valve seat 22 is exposed to the direct flow of fluid is at the lower extreme of the wall of passage 11, and at such region the valve seat is substantially parallel to the passage wall so that turbulence and wear are minimized. In summary, it is pointed out that the seat 22 is tangential to the wall of flow passage 11 at a point immediately adjacent the upstream edge of cavity 14, and lies in a plane which intersects the axis of flow passage 11 at approximately a forty-five degree angle. As previously indicated, the seat 22 has a diameter much greater than that of the passage 11, namely about twice the diameter thereof.

Although the first bore 21 terminates at seat 22, a second and somewhat smaller-diameter cylindrical bore is formed coaxially of the first bore 21 and extends downwardly into the chamber or cavity 14. More specifically, the second bore penetrates cavity 14 to a region where the side walls of the cavity are located outwardly sufficiently far that no metal remains to be bored. Thus, as best shown in FIGURE 3, a cylindrical wall 25 is formed beneath seat 22, coaxially with such seat and with bore 21. The diameter of the wall 25 (formed by the second bore) is less than that of cavity 14 and also less than that of bore 21. On the other hand, the diameter of wall 25 is substantially greater than that of flow passage 11, for example fifty percent greater. The valve seat 22, which is formed between wall 25 and bore 21, has a frustoconical shape and converges toward cavity 14. The angle of seat 22 is such that the wall of the seat is substantially coincident with the wall of passage 11 at the point of tangency therewith.

The movable valve element includes two coaxial cylindrical portions 26 and 27 which may be termed, respectively, the movable head and tip of the valve. Head 26 has a diameter corresponding to that of the first bore 21, in which it is slidably mounted, and is formed at its lower end with a frustoconical shoulder 28 which extends inwardly to the tip 27 and is adapted to seat on the valve seat 22. The acute angle of shoulder 28 should be somewhat smaller than that of the valve seat 22, such angles being in relation to the axis of head 26.

Tip 27 has a diameter corresponding to that of the cylindrical wall 25 formed by the second bore. An angular groove 29 is milled into the tip 27 at a forty-five degree angle relative to the axis thereof, so that the apex edge (line) 31 of such groove is parallel to the axis of flow passage 11. The illustrated groove 29 has side walls disposed perpendicular to each other, but somewhat different relationships may be provided where different flow characteristics are required. The inner end of edge 31 is closely adjacent shoulder 28.

As shown in phantom line in FIGURE 1, the depth and location of the angular groove is such that, when the valve is fully closed, apex edge 31 is coincident with an imaginary line disposed in the wall of flow passage 11 (opposite bore 21) and parallel to the axis of such flow passage. Portions of the tip 27 are then disposed in the lower portion of chamber or cavity 14. Upon upward shifting of the movable valve element by means next to be described, for example to the position shown in full lines in FIGURE 1, a section of the groove 29 is presented to the fluid as indicated in schematic FIGURE 2. The fluid then flows in a straight line through such section, with a minimum of turbulence. It is pointed out that the only place for fluid to flow when the valve is thus partially open is through the angular groove 29, since the cylindrical wall 25 of the valve body seats closely against the cylindrical wall of the tip 27 except at the angular groove.

It is to be understood that the construction is such that the head 26 and tip 27 may be shifted upwardly until all portions of the tip 27 are retracted away from flow passage 11. Thus, when the valve is fully open as shown in FIGURES 3 and 4, a complete unobstructed circle is viewed by an observer looking through the passage 11.

Means are provided to shift the head 26 and tip 27 axially of the bores in which they are slidably mounted. Such means are, however, so constructed that the head and tip may not rotate. Thus, the angular position of the groove 29 remains such that a plane bisecting the angle between the faces thereof is coincident with the plane containing the axes of both passage 11 and bore 21.

The illustrated actuating means comprises a suitable bonnet 32 bolted onto boss 20 and adapted to receive an elongated stem 33 which may be integral with the head 26. An unthreaded portion of the stem 33, relatively adjacent the head, extends through packing means 34 in a stuffing-box portion of the bonnet. Such packing means is mounted by means of a stuffing nut 36 which, in turn, is held in position by a means indicated at 37 and associated with the boss 20 by suitable connectors, not shown.

The outer end of the stem 33 is threaded into a rotatable nut 38 adapted to be driven by a hand wheel 39. The nut 38 is rotatably mounted between a collar 41 and a key-mounting means 42, such elements being maintained against rotation by set screws indicated at 43 and 44. A key 46 is mounted internally in the means 42 and is seated in an elongated keyway 47 in the threaded portion of the stem. As previously indicated, the location of the key is such that the angular groove 29 is maintained against rotation and in the above-indicated position.

Referring next to FIGURE 8, the construction is identical to that shown in FIGURES 1–7 except that the shoulder 28a is formed on a soft material such as Teflon. Such shoulder is formed on a soft ring 48 which may be mounted over a threaded portion 49 provided at the lower end of stem 33a. The head 26a is threaded onto portion 49 and is held against rotation by a lock screw 50. Threading of the head 26a onto portion 49 effects seating of the soft ring 48 against a shoulder formed at the upper end of tip 27a. The device illustrated in FIGURE 8 is adapted for situations wherein perfect sealing at seat 22, with relatively low seating pressures, is required.

*Operation*

Let it be assumed that the valve is initially in the fully closed position shown in phantom lines in FIGURE 1. Shoulder 28 (or 28a) is then seated on the circular valve seat 22, which effectively prevents passage of fluid through the flow passage 11. The pressure in bore 21 and in the flow passage 11 on the upstream side of head 26 aids in maintaining the shoulder 28 tightly pressed against seat 22.

Rotation of the hand wheel 39 effects lifting of the head 26 and tip 27 without effecting rotation thereof, as previously stated. The instant that shoulder 28 is lifted clear of seat 22, a very small cross-section of the groove 29 (closely adjacent shoulder 28) is opened so that a small quantity of fluid may be metered therethrough. Such small quantity of fluid flows parallel to the apex edge 31 of groove 29, with a minimum of turbulence. Additional rotation of hand wheel 39 causes an additional cross-sectional area of the groove 29 to be presented to the fluid, so that the flow is increased in a highly-controllable and infinitely-variable manner. As stated above, the close engagement between wall 25 (FIGURE 3) and the cylindrical surface of tip 27 prevents any substantial flow of fluid except through the groove 29. Regardless of the degree of opening of the valve, the fluid flows in substantially a straight line, so that there is very little turbulence.

Upon rotation of the hand wheel 39 to retract the head and tip to the fully open position shown in FIGURE 3, all portions of the tip are retracted away from the flow path which then becomes completely circular (FIGURE 4). A minimum of resistance is thereby presented to the flowing fluid, so that the pressure drop across the valve is minimized. As previously pointed out, the valve seat 22 is either disposed outwardly from passage 11 or is tangential thereto, the result being that there is a minimum of turbulence and fluid impingement on the valve seat so that wear thereof is much less than in conventional metering valves.

It is a feature of the present apparatus that the wall 25, and the wall of bore 21, effect stabilization of the head 26 and tip 27 to such a degree that there may be no vibration thereof. This is to be contrasted with conventional metering valves, such as needle valves, which frequently vibrate violently under conditions where there is high-pressure flow during the lower percentages of flow.

It is also a feature of the invention that the flow curve remains nearly constant to zero flow, this being because of the fact that turbulence is relatively small, even in the lower percentages of flow. In ordinary plug or needle valves, turbulence increases as the plug nears its seat. Such turbulence causes unpredictable fluctuations in the lower flow ranges.

It is another feature of the valve that it is relatively resistant to clogging and freezing. Since all of the flow is concentrated in a generally triangular-shaped opening, as distinguished from an annular opening, much larger solid particles may pass through a given orifice area.

There is a greatly reduced tendency toward formation of ice particles and consequent bridging of the orifice. Except as specifically stated, the present embodiment corresponds exactly to that of FIGURES 1–7.

Embodiment of FIGURE 9

FIGURE 9 illustrates, in fully closed position, an embodiment wherein the tip 27 is omitted. Since the tip is omitted, the associated bulbous chamber or cavity 14 may also be omitted. Thus, head 26 is cut off, in a plane perpendicular to the axis thereof and immediately adjacent shoulder 28.

The valve illustrated in FIGURE 9 is distinctly inferior to the one previously described, for various reasons including increased susceptibility to clogging, less desirable and effective metering, etc. However, certain substantial economies may be effected, making the valve suitable for use in a number of instances where cost is an important factor, and where the fluid does not contain particulate matter which may clog the flow passage.

The present embodiment eliminates the need for the key 46 and related mechanism, since the stem 33 and head 26 may be permitted to rotate with hand wheel 39. Thus, the actuating means may be greatly simplified. The cost of the valve may also be reduced by using a body 10 which is not cast but instead merely selected from suitable stock and then drilled.

Although the valve of FIGURE 9 does not incorporate numerous advantages of the previous embodiment, it is nevertheless greatly superior to prior-art valves. One important reason for this is that only a small portion of valve seat 22 is disposed in flow passage 11, and such seat portion is substantially coincident with the flow passage wall. Accordingly, the valve seat does not create any substantial turbulence, or interfere with fluid flow.

Embodiment of FIGURES 10–12

The embodiment of FIGURES 10–12 is identical to that of FIGURES 1–7, except as will be specifically stated. In the present embodiment, the tip or cylinder 27a (coaxial with head 26, but reduced in diameter at shoulder 28) is not notched but instead elongated and bored to form a flow passage 50 obliquely therethrough. Passage 50 has a cylindrical wall which corresponds in diameter and angle to the wall of passage 11, being flush therewith and forming an extension thereof when the valve is fully open as shown in FIGURE 10. It will therefore be understood that the valve is characterized by almost a complete absence of turbulence.

In order to receive the extended cylindrical tip 27a, valve body 10a is formed with a cylindrical cavity 51 adapted to receive tip 27a in relatively close-fitting relationship as shown in FIGURE 11. Thus, cavity 51 is oblique to flow passage 11. A passage 52 may be formed through tip 27a between passage 50 and cavity 51, to aid in relieving the pressure in cavity 51 during axial movement of the tip therein.

It is emphasized that the valve of FIGURES 10–12 may be operated to complete shut-off, as shown in FIGURE 11, shoulder 28 then seating closely on seat 22. It is also emphasized that a metering action is achieved when the movable valve element is between its fully-open and shut-off positions. A representative flow section, when the valve is in an intermediate position, is indicated schematically in FIGURE 12. Such flow sections, which are generally elliptical, are relatively unsusceptible to clogging.

The valve body of FIGURES 10–12 may be fabricated as a weldment instead of being cast, so that it is extremely light. The tubing employed in such fabrication may be made double walled, for cryogenic purposes.

It is emphasized that the head 26 prevents any substantial flow of fluid through the bore or opening 21. Thus, all flow in the valves is through flow passage 11, and through groove or notch 29 or passage 50.

Various embodiments of the present invention, in addition to what has been illustrated and described in detail, may be employed without departing from the scope of the accompanying claims.

I claim:
1. A valve, which comprises a valve body having a flow passage therethrough, said flow passage having a cylindrical wall of predetermined diameter, said valve body also having a cylindrical bore formed therein and intersecting said flow passage at an acute angle, said valve body being formed with a chamber communicating with said flow passage and disposed opposite said bore, the axis of said bore and the axis of said flow passage lying in substantially the same plane, said bore having a diameter substantially greater than that of said flow passage, all central and peripheral portions of said bore communicating freely with said flow passage, a substantially frustoconical valve seat formed integrally in said valve body coaxially of said bore in a plane perpendicular to the axis of said bore and generally tangential to said passage at the extreme inner end of said bore, said seat being spaced outwardly from said passage at all points excepting the point of tangency between said seat and said passage, the angle of said frustoconical seat being such that the surface of said seat is substantially coincident with the wall of said flow passage at said point of tangency, movable means mounted in said bore for seating on said valve seat to block flow of fluid through said passage, said movable means being movable from a position seated on said seat and blocking flow of fluid through said passage to a position completely retracted away from said passage whereby a straight-through unobstructed flow path is provided through said passage, and a tip element provided on said movable means for insertion into said chamber when said movable means is in seated position on said valve seat, said valve body being formed with wall means adapted to cooperate with said tip element to stabilize said movable means.

2. A metering valve, comprising a valve body having a flow passage therethrough, a movable element movably mounted in said valve body for movement into and out of said flow passage, and means to move said movable element into and out of said flow passage at an oblique angle to said flow passage and in the absence of rotation of said movable element, said oblique angle being on the order of forty-five degrees, said movable element having a groove therein of V-section, the apex of said V-section groove being oblique to the axis of said movable element and being substantially parallel to the axis of said flow passage, said valve body having a recess adapted to receive portions of said movable element and sufficiently deep to permit said apex to be moved to a position at which said apex is coincident with a line disposed in the wall of said flow passage and parallel to the axis thereof.

3. A combination metering and shut-off valve, comprising a valve body having a straight-through cylindrical flow passage therein, a first bore formed in said valve body and intersecting said flow passage at substantially a forty-five degree angle, the axis of said first bore and the axis of said flow passage lying in the same plane, said first bore having a diameter on the order of twice that of said flow passage, said valve body having a valve seat at the inner end of said first bore coaxially therewith and tangential to said flow passage on the opposite side thereof from said first bore, a second bore formed in said valve body coaxially of and adjacent said first bore and having a diameter on the order of fifty percent greater than that of said flow passage, said second bore communicating with a chamber formed in said valve body generally opposite said first bore, a cylindrical head and a connected cylindrical tip provided coaxially adjacent each other, said head having a diameter corresponding to that of said first bore and being movably mounted therein, said tip having a diameter corresponding to that of said second bore and being movably mounted therein, a shoulder provided at the junction of said head and tip and adapted to seat on said valve seat, V-shaped groove means provided in said tip at substantially a forty-five degree angle to the common axis of said head and tip, said V-shaped groove means being so positioned that a plane bisecting the angle between the walls thereof lies in said plane containing the axes of said flow passage and said first bore, said V-shaped groove means being so located that the apex edge thereof is substantially coincident with a straight line disposed in the wall of said flow passage opposite said first bore when said shoulder is seated on said seat, portions of said tip then being disposed in said chamber, and means to effect conjoint movement of said head and said tip in the absence of rotation thereof.

4. The invention as claimed in claim 3, in which said seat is frustoconical and lies in a plane perpendicular to the axis of said first bore, the surface of said seat being substantially coincident with the wall of said flow passage at the point of tangency therewith.

5. The invention as claimed in claim 3, in which said last-named means includes key means to non-rotatably associate said head and tip with said body, said key means being external to said valve body.

6. A metering and shut-off valve, which comprises a valve body having a straight flow passage therethrough, the wall of said flow passage being a cylinder of predetermined diameter, said valve body also having an opening therein communicating freely and transversely with said flow passage, the wall of said opening being cylindrical about an axis which intersects the axis of said flow passage at an oblique angle, said wall of said opening having a diameter substantially greater than said predetermined diameter of said flow passage, a frustoconical valve seat formed integrally in said valve body coaxially of said opening and having a major diameter substantially the same as that of said opening, a portion of said seat being tangential to said flow passage, said tangential seat portion being substantially coincident with the adjacent region of said flow passage wall, and a cylindrical movable valve element movably mounted in said opening in relatively close-fitting relationship and adapted to seat on said valve seat, said movable valve element having a cylindrical axial extension the diameter of which is substantially less than that of said opening whereby a shoulder is formed at the junction of said extension and the main body of said movable valve element, said shoulder being adapted to seat sealingly on said valve seat, said valve body being formed opposite said opening with a recess adapted to receive at least part of said axial extension.

7. The invention as claimed in claim 6, in which said axial extension is notched or grooved to receive and meter fluid passing through said flow passage.

References Cited by the Examiner
UNITED STATES PATENTS

| | | | |
|---|---|---|---|
| 665,083 | 1/01 | Friedmann | 251—122 |
| 1,919,233 | 7/33 | Lee | 11—356 |
| 2,014,642 | 9/35 | Andrews | 251—205 X |
| 2,883,148 | 4/59 | Williams | 251—205 |
| 2,980,392 | 4/61 | Greenwood | 251—210 |

FOREIGN PATENTS

| | | |
|---|---|---|
| 177,621 | 2/54 | Austria. |
| 614,961 | 2/61 | Canada. |
| 613,022 | 5/35 | Germany. |
| 258,949 | 10/26 | Great Britain. |
| 454,546 | 10/36 | Great Britain. |
| 311,469 | 10/33 | Italy. |
| 213,986 | 6/41 | Switzerland. |
| 259,913 | 7/49 | Switzerland. |

ISADOR WEIL, *Primary Examiner.*
WILLIAM F. O'DEA, *Examiner.*